(12) United States Patent
Kurtovic et al.

(10) Patent No.: US 8,775,022 B2
(45) Date of Patent: Jul. 8, 2014

(54) METHODS AND SYSTEMS PROVIDING SEAT VENTILATION

(71) Applicant: Toyota Motor Engineering & Manufacturing North America, Inc., Erlanger, KY (US)

(72) Inventors: Kenan Kurtovic, Ypsilanti, OH (US); Jeffrey W. Sosnowski, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/675,040

(22) Filed: Nov. 13, 2012

(65) Prior Publication Data

US 2014/0136049 A1 May 15, 2014

(51) Int. Cl.
| | | |
|---|---|---|
| G01G 19/12 | (2006.01) | |
| G06F 7/00 | (2006.01) | |
| B60K 28/04 | (2006.01) | |
| B60N 2/00 | (2006.01) | |

(52) U.S. Cl.
CPC B60K 28/04 (2013.01); B60N 2/002 (2013.01)
USPC .............................. 701/36; 701/45; 180/273

(58) Field of Classification Search
USPC ......... 701/36, 45; 236/51; 297/180.1, 180.12, 297/180.13, 180.14, 180.16, 181; 454/75, 454/120, 156; 165/42, 46; 180/273; 177/136; 340/667
See application file for complete search history.

(56) References Cited

U.S. PATENT DOCUMENTS

| | | | |
|---|---|---|---|
| 6,786,273 B2 | 9/2004 | Ichigaya | |
| 6,991,532 B2 | 1/2006 | Goldsmith | |
| 7,181,324 B2* | 2/2007 | Fischer et al. | 701/36 |
| 7,389,812 B2* | 6/2008 | Kumada et al. | 165/203 |
| 7,460,939 B2* | 12/2008 | Wanami | 701/45 |
| 7,497,251 B2* | 3/2009 | Ichishi et al. | 165/202 |
| 7,873,451 B2 | 1/2011 | Hartmann et al. | |
| 8,096,482 B2 | 1/2012 | Dage | |
| 2002/0104367 A1* | 8/2002 | Lich et al. | 73/1.13 |
| 2005/0085968 A1* | 4/2005 | Panic | 701/36 |
| 2006/0175877 A1 | 8/2006 | Alionte et al. | |
| 2007/0132220 A1* | 6/2007 | Breed et al. | 280/735 |
| 2011/0284202 A1* | 11/2011 | Hirai et al. | 165/287 |
| 2012/0202413 A1* | 8/2012 | Kawashima | 454/75 |
| 2013/0211669 A1* | 8/2013 | DePetro | 701/36 |

OTHER PUBLICATIONS

URL: http://www.hvacsolutionsdirect.com/products/Thermostats-Motion-Sensors/Infrared-Motion-Sensors-Occupancy-Sensors/Controlled-Air-Systems-MOTION-OCCUPANCY-DETECTION-SENSOR-SKU703.html.

* cited by examiner

*Primary Examiner* — Thomas Tarcza
*Assistant Examiner* — Tyler J Lee
(74) *Attorney, Agent, or Firm* — Dinsmore & Shohl LLP

(57) ABSTRACT

A method of providing seat ventilation using a seat ventilation system (SVS) within a vehicle is provided. The method includes determining whether a vehicle seat is occupied using an air bag ECU. Occupancy information is provided from the air bag ECU to an air conditioning ECU. The air conditioning ECU controls a seat climate module based on the occupancy information received from the air bag ECU.

20 Claims, 3 Drawing Sheets

METHODS AND SYSTEMS PROVIDING SEAT VENTILATION

TECHNICAL FIELD

The present specification generally relates to methods and systems providing seat ventilation within a vehicle.

BACKGROUND

Typical seat ventilation systems (SVSs) blow air through a surface of a seat in order to provide airflow around an occupant of the seat. For example, in some SVSs, a blower is attached to a bottom surface of the seat and air is blown through air passages provided within the seat. In some cases, the blower may be connected to an air conditioning unit to provide cooled or heated air to the passenger through the seat. Operation of the SVSs may be controlled manually in a fashion similar to many air conditioning units where an occupant turns the blower on and selects an air temperature for the blown air.

SUMMARY

In one embodiment, a method of providing seat ventilation using a seat ventilation system (SVS) within a vehicle is provided. The method includes determining whether a vehicle seat is occupied using an air bag ECU. Occupancy information is provided from the air bag ECU to an air conditioning ECU. The air conditioning ECU controls a seat climate module based on the occupancy information received from the air bag ECU.

In another embodiment, a control system includes a seat ventilation system (SVS) and an air bag system. The control system includes an occupant classification sensor that provides a weight signal in response to a force applied against a vehicle seat of a vehicle. An air bag ECU receives the weight signal and generates occupancy information based on the weight signal. An air conditioning ECU receives the occupancy information. A seat climate module is controlled by the air conditioning ECU based on the occupancy information.

In another embodiment, a method of providing seat ventilation using a seat ventilation system (SVS) within a vehicle is provided. The method includes determining whether a vehicle seat is occupied using an air bag ECU. Occupancy information is provided from the air bag ECU to an air conditioning ECU. The air conditioning ECU ignores whether the vehicle seat is occupied for a preselected time period if an adjustment is made to an SVS setting.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to control systems and methods providing seat ventilation within a vehicle. The control systems generally include an air bag system including an occupant classification sensor that is used to determine presence of an occupant on a seat of the vehicle. An air bag electronic control unit (ECU) may receive an indication from the occupant classification sensor indicating presence of the occupant. A seat ventilation system (SVS) utilizes an air conditioning ECU that receives an indication from the air bag ECU that the occupant is present in the seat. Unless the occupant is present, the air conditioning ECU may prevent the SVS from operating.

Figure 1:
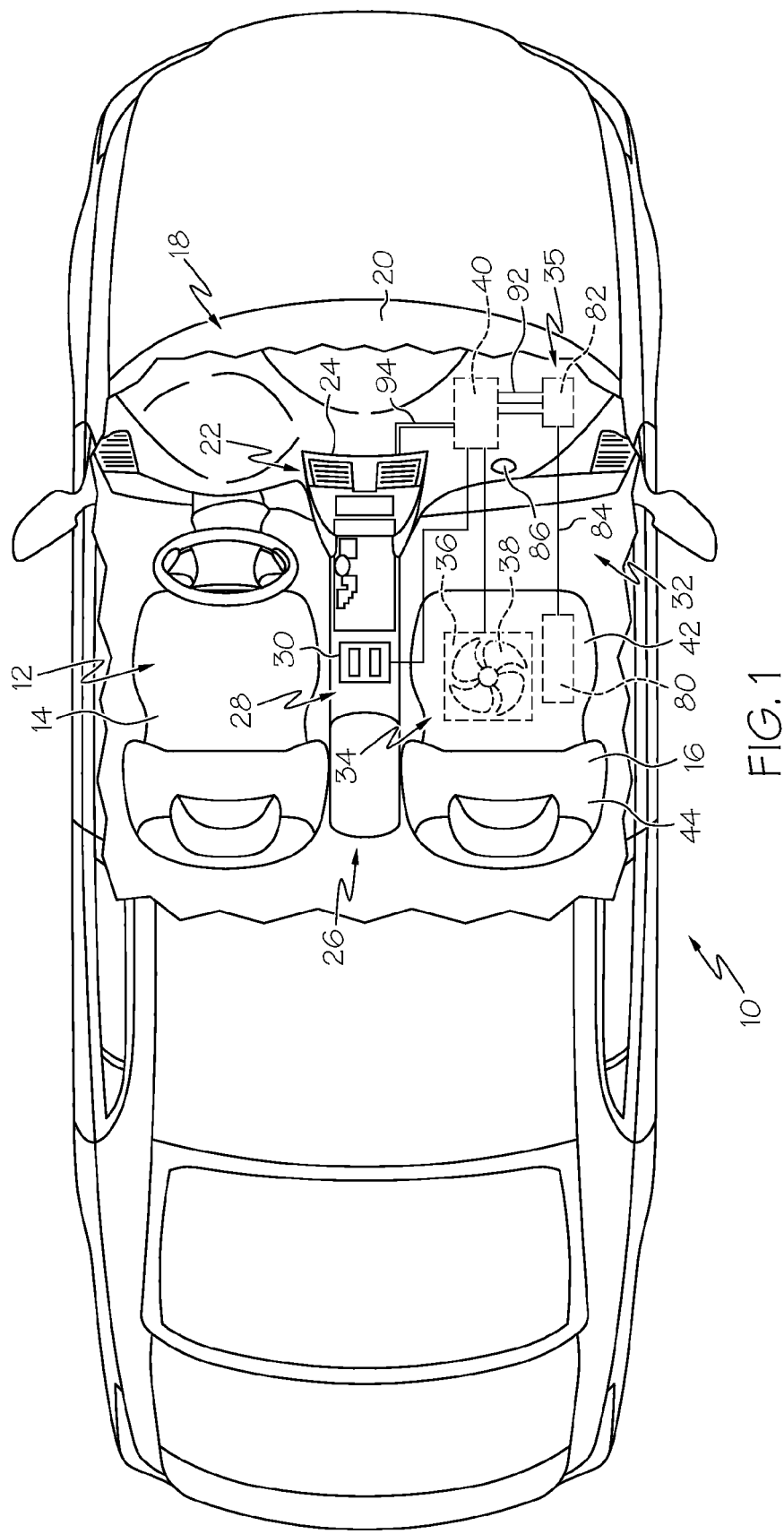
FIG. 1 is a schematic top view of a vehicle including an air bag system and a seat ventilation system according to one or more embodiments described herein.

Referring to FIG. 1, an exemplary vehicle 10 includes an interior 12 having a driver side front seat 14 and a passenger side front seat 16. In some embodiments, the vehicle 10 may also include one or more rear seats (not shown). In other embodiments, the vehicle may only include the driver side front seat 14 and the passenger side front seat 16. A vehicle dash board assembly 18 is located forward of the front seats 14 and 16 and runs in a vehicle widthwise direction beneath a front window 20. The vehicle dash board assembly 18 may include various instruments, controls and displays for use in controlling various systems of the vehicle 10. For example, an air conditioning panel 22 with air conditioning controls 24 may be provided by the vehicle dash board assembly 18. A center console assembly 26 may extend rearwardly from the vehicle dash board assembly 18 and between the front seats 14 and 16. The center console assembly 26 may include various instruments, controls and displays for use in controlling various systems of the vehicle 10. For example, a seat climate control panel 28 with SVS controls 30 may be provided by the center console assembly 26.

The vehicle 10 includes a control system 32 including an SVS 34 and an air bag system 35. The SVS 34 includes a seat climate module 36 (e.g., including a fan or other air pump 38) that is controlled by an air conditioning ECU 40. The seat climate module 36 may located within a seat portion 42 of the passenger side front seat 16. In some embodiments, the seat climate module 36 may be located in a back portion 44 of the passenger side front seat 16, or there may be multiple seat climate modules located in the seat portion 24 and the back portion 44 of the passenger side front seat 16.

Figure 2:
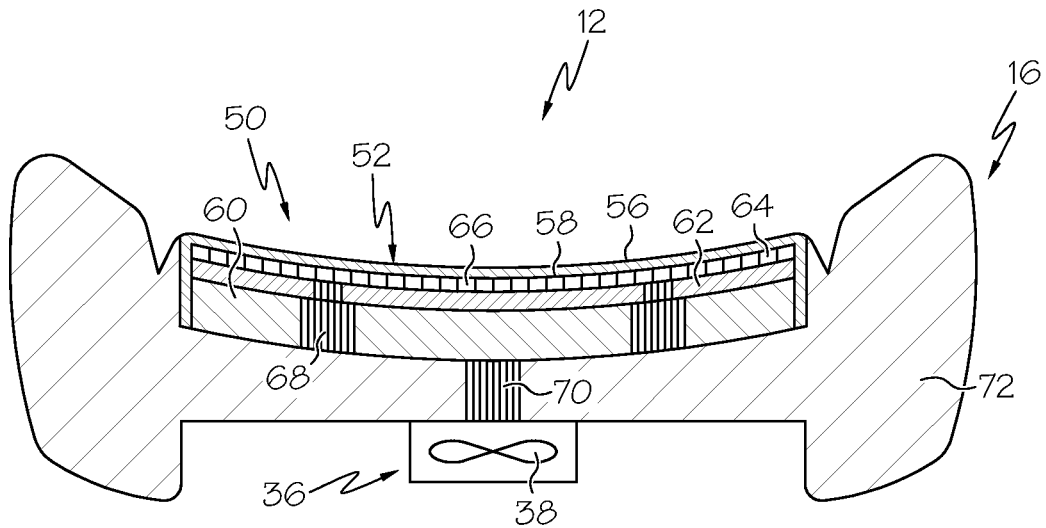
FIG. 2 is a section view of a vehicle seat for use in the vehicle of FIG. 1 according to one or more embodiments described herein.

As one example, referring to FIG. 2, the seat climate module 36 may pull or draw air from the interior 12 through the front seat 16. A seat back 50 may include a back pad 52, an air pump 38, such as a fan, for suction and a seat cover 56. The back pad 52 constitutes a cushion member. The air pump 54 can pull air from the interior 12 through the seat cover 56, through a front face 58 of the back pad 52 and into the back pad 52. The back pad 52 may be constituted by a first back pad 60, thin-walled back pad 62, and a net-like cushion member 64 arranged at a front face of the back pad 60. The back pad 60 may be relatively thick-walled and constitute a main body of the back pad 52. The net-like cushion member 64 may be constituted by a three-dimensional solid structure by fiber members. Thereby, the net-like cushion member 64 may be provided with a constant elasticity and be made to be permeable in a thickness direction and a plane direction. The first back pad 60, the back pad 62, and the net-like cushion member 64 may be bonded to each other by adhering, stitching or the like. The first back pad 60 and the back pad 62 may be formed by urethane foam, as an example.

A plurality of through holes 66 constituting air intake ports may be provided through the thin-walled back pad 62. Air distributing channels 68 may be provided through the first back pad 60 for distributing negative pressure throughout the seat back 50. The air distributing channels 68 may be in communication with another air distributing channel 70 formed through a main seating portion 72 of the front seat 16, which is in communication with the seat climate module 36.

During operation, air is pulled from the interior 12 through the seat cover 56, through a front face 58 of the back pad 52 and into the back pad 52. Because of this, the seat cover 56 may act as an air filter, which can cause the seat cover 56 to collect materials over time. Such filtering effects can be magnified when an occupant is not sitting in the front seat 16. Referring back to FIG. 1, the SVS 34 utilizes an occupant classification sensor 80 for detecting the presence of an occupant in the front seat 16. The occupant classification sensor 80 may be part of the air bag system 35. As one example, the occupant classification sensor 80 may be a load sensor for determining weight of an occupant. In particular, the occupant classification sensor 80 may provide a weight signal in response to a force or pressure applied against the seat portion 42 of the seat 16. The weight signal may be supplied to an air bag ECU 82, for example, via a hardwire connection 84 and/or a wireless connection. Once the weight is determined by the air bag ECU 82 based on the weight signal, the air bag ECU 82 may include logic for classifying the occupant, for example, as an adult, child or infant. For example, the air bag ECU 82 may compare the determined weight against one or more threshold weight values saved in memory. A determined weight above a first threshold weight value may indicate an adult and a determined weight below a second threshold value less than the first threshold value may indicate an infant. A determined weight between the first and second threshold weight values may indicate a child. A determined weight below a third threshold value less than the second threshold value may indicate no occupant is present.

The occupancy information (e.g., adult, child, infant, no occupant) may be used by the air bag ECU 82 in deploying an air bag 86. The air bag 86 deployment may be controlled based on the occupancy information. For example, if the occupancy information indicates an adult is seated in the front seat 16, the air bag 86 may be deployed in a normal fashion using a normal deployment force. If the occupancy information indicates a child or an infant, the air bag 86 may not be deployed or the air bag 86 may be deployed at a lower deployment force than the normal deployment force.

The air bag ECU 82 may supply the occupancy information to the air conditioning ECU 40. The occupancy information may be provided by the air bag ECU 82 to the air conditioning ECU 40 via CAN bus 92. The occupancy information may include the adult, child, infant, no occupant classification, or the occupancy information may be simply occupant/no occupant. In other embodiments, the air bag ECU 82 may use the occupancy information to determine whether or not an occupant is present in the front seat 16.

Referring still to FIG. 1, the air conditioning control panel 22 is provided that can be used by an occupant to provide input to the air conditioning ECU 40 via a local interconnect network (LIN) connection 94. Similarly, the seat climate control panel 28 is provided that can be used by the occupant to provide input to the air conditioning ECU 40, which controls operation of the seat climate module 36. As will be described in greater detail below, the occupancy information is used by the air conditioning ECU 40 in controlling operation of the seat climate module 36.

Figure 3:
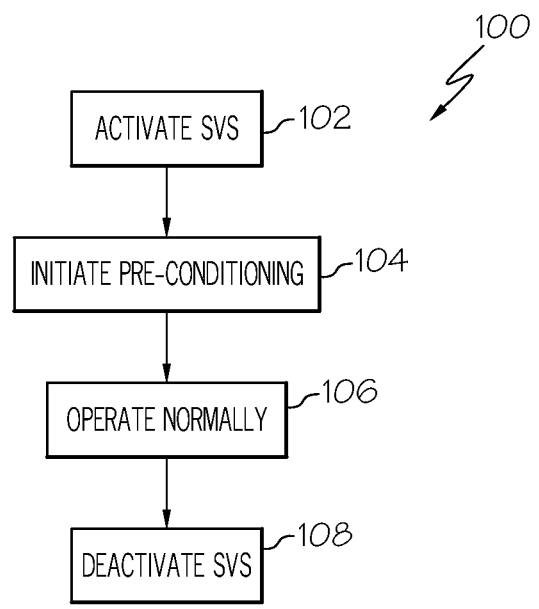
FIG. 3 illustrates a method of providing seat ventilation according to one or more embodiments described herein.

Referring to FIG. 3, a method 100 of providing seat ventilation includes activating the SVS 34 using the seat climate control panel 28 at step 102. Once activated, the SVS 34 may initiate a pre-conditioning routine at step 104. The pre-conditioning routine, as will be described in greater detail below, can ignore the occupant status determined using the occupancy information to allow the SVS 34 to operate for a preselected time period, even when no occupant is sitting in the front seat 16. Such a pre-conditioning operation can be used to cool or heat the front seat 16 in anticipation of an occupant's presence. At step 106, the SVS 34 may operate normally when an occupant is located in the front seat 16. At step 108, the SVS 34 may turn off using the seat climate control panel 28. In some embodiments, a delay timer may be added before shutting the SVS 34 down.

Figure 4:
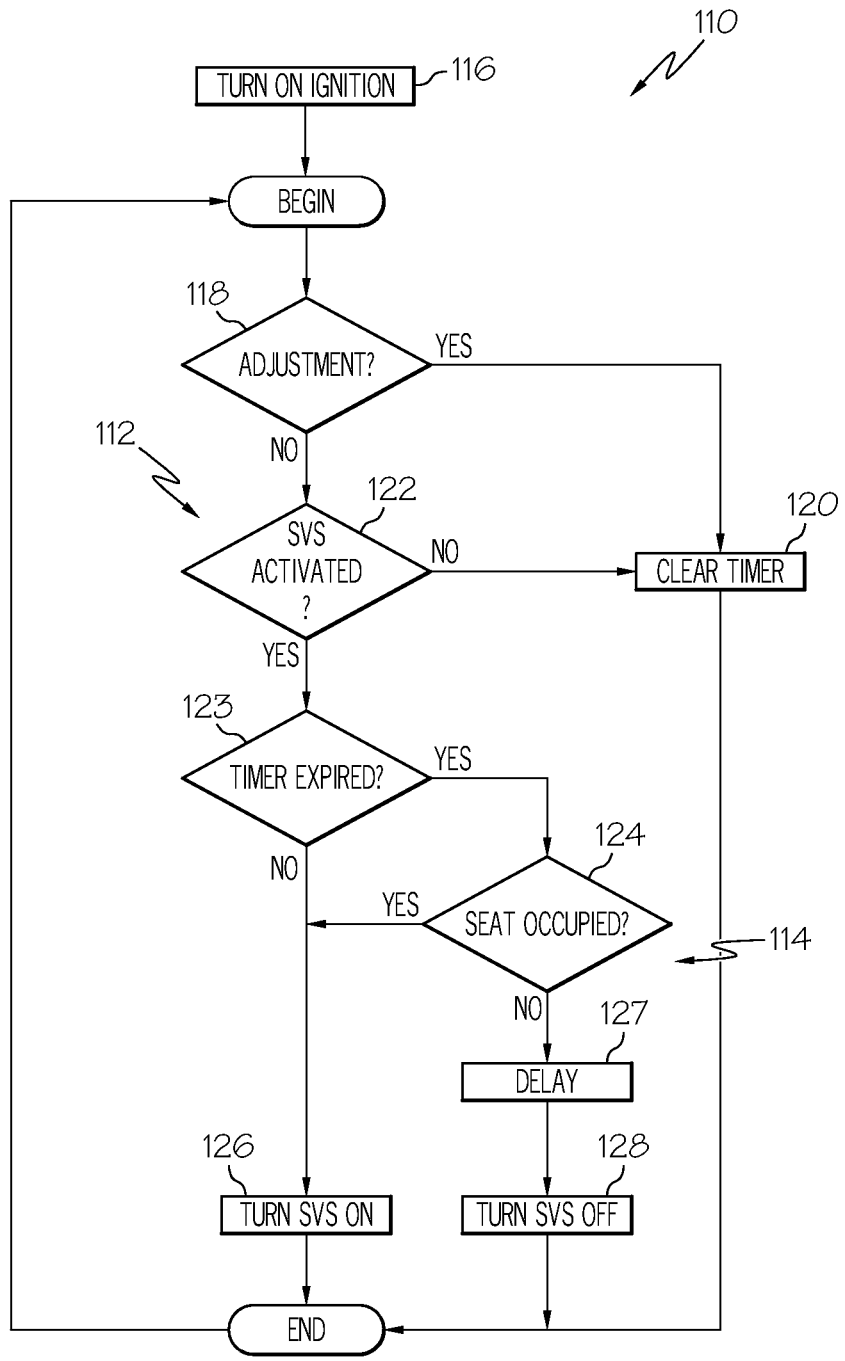
FIG. 4 illustrates a more detailed method of providing seat ventilation according to one or more embodiments described herein.

Referring now to FIG. 4, a more detailed method 110 of providing seat ventilation is illustrated. The method 110 has a pre-conditioning routine 112 where seat occupancy is ignored during a preselected time period and a primary conditioning routine 114 where the air conditioning ECU 40 looks at the seat occupancy status for determining whether to activate or shut down the seat climate module 36. The pre-conditioning routine 112 includes turning ON the vehicle's ignition at step 116. A timer value may be cleared each time the vehicle ignition is turned from OFF to ON. At step 118, the air conditioning ECU 40 determines whether there has been an adjustment to the SVS setting, for example, using the seat climate control panel 28. If the operator has not activated the SVS 34, then there is no adjustment to the SVS setting and the timer remains cleared. If the operator activates the SVS 34, there is an adjustment to the SVS setting at step 118 and again the timer is cleared at step 120. Once the timer is cleared at step 120, the pre-conditioning routine 112 begins again where, at step 118, the air conditioning ECU 40 determines whether there has been an adjustment to the SVS setting. If no further adjustment is made, the air conditioning ECU 40 determines whether the SVS 34 is activated at step 122. With the SVS 34 activated, the air conditioning ECU 40 determines whether the timer is expired at step 123. Because the timer is cleared at step 120, the air conditioning ECU 40 ignores the occupancy status of the front seat 16 and allows the SVS 34 to remain active with the seat climate module 36 running under the occupant specified conditions.

The pre-conditioning routine 112 continues until the timer expires. Any suitable time period may be selected for the timer, such as about 10 minutes. The pre-conditioning time period may be factory set, and/or may be selectable by the vehicle occupant. For example, the pre-conditioning time period may be any time value between one minute and 30 minutes, such as 5, 10, 15, 20 minutes. Once the timer expires, assuming there are no adjustments to the SVS 34, the air conditioning ECU 40 determines whether the front seat 16 is occupied at step 124. If the front seat 16 is occupied, the SVS 34 remains active at step 126 with the seat climate module 36 running under the occupant specified conditions. If the front seat is empty or not occupied, the SVS 34 is turned OFF at step 128 by the air conditioning ECU 40. At step 127, a delay timing may be employed before turning the SVS OFF at step 128. The delay timing step 127 can allow for continued running of the SVS for a predetermined time period (e.g., such as between 1 second and 45 minutes, such as between 1 minute and 20 minutes, such as 5 minutes) which can allow an occupant to leave the seat briefly and return without re-initiating the seat ventilation process.

The above-described control system 32 utilizes both the SVS 34 and an air bag system 35 to provide seat ventilation. The SVS 34 includes the air conditioning ECU 40 that utilizes a classification determination from the air bag ECU 82 based on load information from the occupant classification sensor 80 to determine whether the front seat 16 is occupied or not. If the front seat is not occupied, then the air conditioning ECU 40 can shut down the seat climate module 36 during the primary conditioning routine 114. Thus, a majority of the SVS 34 operation time will be while an occupant is present in the front seat 16, thereby reducing filtration by the front seat fabric and overall electrical consumption while increasing system longevity. The pre-conditioning routine 112 may also be provided where the air conditioning ECU 40 ignores whether the front seat 16 is occupied and allows the SVS 34 to operate when an adjustment is made. Such a pre-conditioning routine 112 can allow for conditioning (e.g., cooling) of the front seat 16 in anticipation of an occupant's presence. While the SVS 34 is described in use with the front seat 16, the SVS or multiple units can be used with any of the front or rear seats within the vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of providing seat ventilation using a seat ventilation system (SVS) within a vehicle, the method comprising:
    determining whether a vehicle seat is occupied using an occupant classification sensor in electronic communication with an air bag ECU;
    providing occupancy information from the air bag ECU to an air conditioning ECU, the air conditioning ECU controlling a seat climate module based on the occupancy information received from the air bag ECU;
    determining whether a user-initiated adjustment is made to an SVS setting using the air conditioning ECU; and
    ignoring whether the vehicle seat is occupied for a preselected time period, using the air conditioning ECU, if a user-initiated adjustment is made to the SVS setting.

2. The method of claim 1, wherein the step of determining whether a vehicle seat is occupied includes providing a weight signal to the air bag ECU from the occupant classification sensor.

3. The method of claim 1 further comprising allowing the seat climate module to pull air from an interior of the vehicle through the vehicle seat if the vehicle seat is occupied.

4. The method of claim 1, wherein the preselected time period is between one minute and 30 minutes.

5. The method of claim 1 further comprising deactivating the seat climate module after the preselected time period if the vehicle seat is unoccupied using the air conditioning ECU.

6. A control system including a seat ventilation system (SVS) and an air bag system, the control system comprising:
    an occupant classification sensor that provides a weight signal in response to a force applied against a vehicle seat of a vehicle;
    an air bag ECU that receives the weight signal and generates occupancy information based on the weight signal;
    an air conditioning ECU that receives the occupancy information; and
    a seat climate module that is controlled by the air conditioning ECU based on the occupancy information;
    wherein the air conditioning ECU determines whether a user-initiated adjustment is made to an SVS setting and the air conditioning ECU ignores whether the vehicle seat is occupied for a preselected time period if a user-initiated adjustment is made to the SVS setting.

7. The control system of claim 6, wherein the seat climate module pulls air from an interior of the vehicle through the vehicle seat during operation.

8. The control system of claim 6 further comprising a seat climate control panel that provides occupant initiated control signals to the air conditioning ECU.

9. The control system of claim 8, wherein the air conditioning ECU determines whether the user-initiated adjustment is made to an SVS setting using the seat climate control panel.

10. The control system of claim 6, wherein the preselected time period is between one minute and 30 minutes.

11. The control system of claim 6, wherein the air conditioning deactivates the seat climate module after the preselected time period if the vehicle seat is unoccupied.

12. A method of providing seat ventilation using a seat ventilation system (SVS) within a vehicle, the method comprising:
    determining whether a vehicle seat is occupied using an occupant classification sensor in electronic communication with an air bag ECU; and
    providing occupancy information from the air bag ECU to an air conditioning ECU, the air conditioning ECU ignoring whether the vehicle seat is occupied for a preselected time period if a user-initiated adjustment is made to an SVS setting.

13. The method of claim 12, wherein the user-initiated adjustment to the SVS setting is made by an occupant using a seat climate control panel.

14. The method of claim 12, wherein the step of determining whether a vehicle seat is occupied includes providing a weight signal to the air bag ECU from the occupant classification sensor.

15. The method of claim 12 further comprising allowing a seat climate module to pull air from an interior of the vehicle through the vehicle seat if the vehicle seat is occupied.

16. The method of claim 12, wherein the preselected time period is between one minute and 30 minutes.

17. The method of claim 12 further comprising deactivating the seat climate module after the preselected time period if the vehicle seat is unoccupied using the air conditioning ECU.

18. The method of claim 1, further comprising distributing negative pressure throughout a seat back of the vehicle seat and pulling air from the interior of the vehicle through a front face of the vehicle seat.

19. The control system of claim 6, wherein negative pressure is distributed by at least one air distributing channel throughout a seat back of the vehicle seat therein pulling air from the interior of the vehicle through a front face of the vehicle seat.

20. The method of claim 12, further comprising distributing negative pressure throughout a seat back of a vehicle seat and pulling air from the interior of the vehicle through a front face of the vehicle seat.

* * * * *